United States Patent Office 3,580,705
Patented May 25, 1971

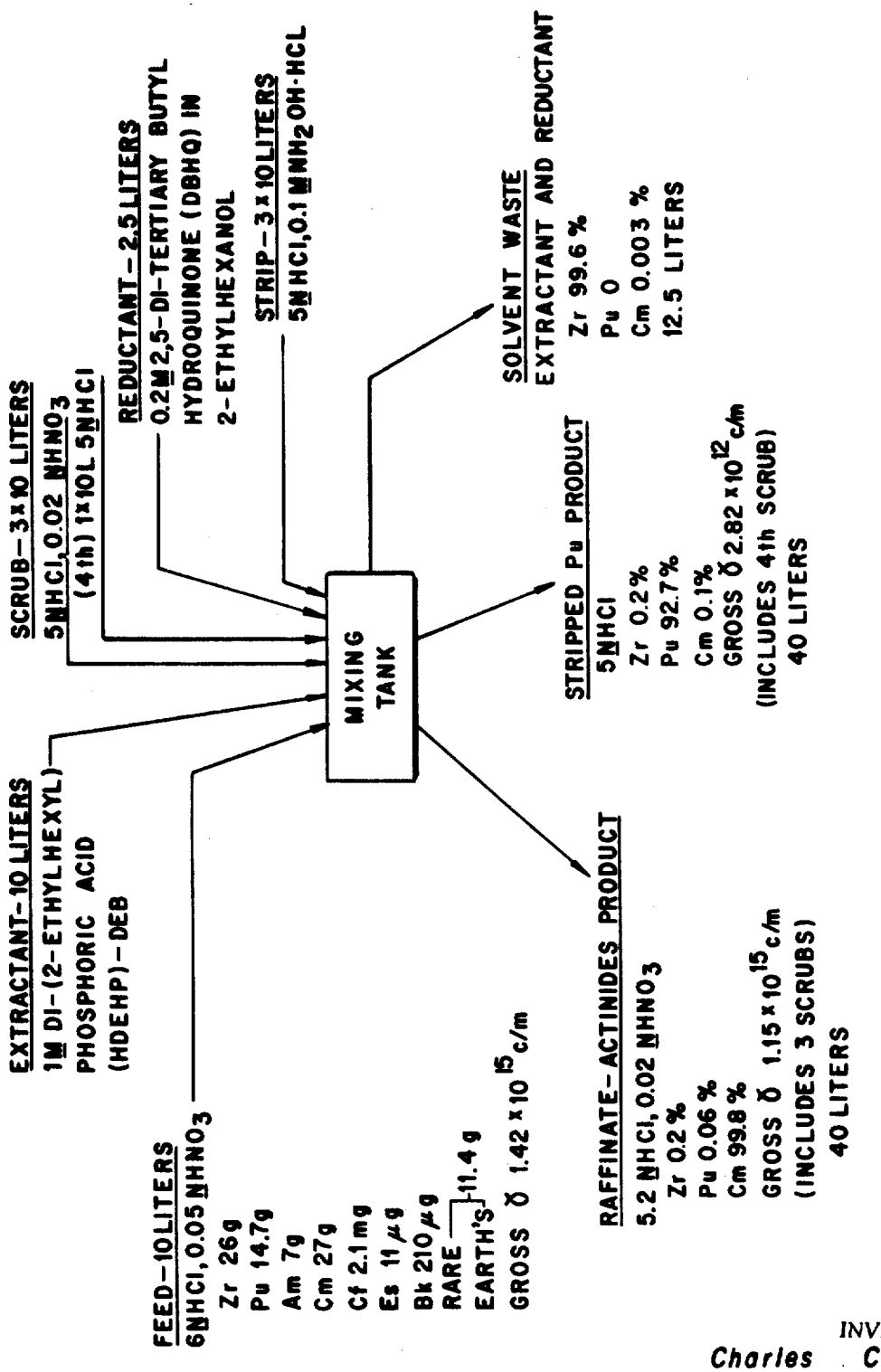

3,580,705
SELECTIVE STRIPPING OF PLUTONIUM FROM ORGANIC EXTRACTS
Charles Coleman and Boyd S. Weaver, Oak Ridge, Tenn., assignors to the United States of America as represented by the United States Atomic Energy Commission
Filed Oct. 2, 1968, Ser. No. 764,494
Int. Cl. B01d *11/00;* C01g *56/00*
U.S. Cl. 23—341
5 Claims

ABSTRACT OF THE DISCLOSURE

Dialkyl substituted hydroquinones dissolved in an organic solvent have been found effective in reducing plutonium in the +4 and +6 oxidation states dissolved in diesters of orthophosphoric acids such as di(2-ethylhexyl) phosphoric acid to the +3 oxidation state. This enables quantitative stripping of the plutonium with aqueous solutions of hydrochloric acid.

BACKGROUND OF THE INVENTION

The invention described herein was made in the course of, or under, a contract with the United States Atomic Energy Commission.

The present invention relates to an improved liquid-liquid extraction process for plutonium. More particularly, it is concerned with means for effectively stripping plutonium from an organic extract containing plutonium, transplutonium elements, i.e., those having an atomic number greater than 95, lanthanides, uranium, and other metal contaminants arising principally from the dissolution of plutonium in metal container systems.

The state of the nuclear reactor art has recently progressed to the stage where it is now possible to produce usefully large quantities of transplutonium elements in a relatively short time by exposing plutonium-242 to high intensity neutron flux reactors. Since many of the transplutonium elements have short half-lives, it is required that the plutonium targets be processed at a time when a major part of the plutonium has not yet been transmuted. Since the plutonium-242 starting material is extremely expensive, processes have been developed in an attempt to provide an economical and rapid separation of plutonium from its transmutation products and other metal contaminants. The present invention is directed to an improvement in a liquid-liquid solvent extraction scheme for separating plutonium from these aforementioned materials.

The use of dialkyl esters of orthophosphoric acids as liquid-liquid solvent extraction reagents for such elements as uranium, lanthanide elements, actinide elements, and plutonium is well known. It is known, for example, that plutonium in the +4 and +6 oxidation states is readily extracted from aqueous hydrochloric acid solutions into a solution of di(2-ethylhexyl) phosphoric acid (HDEHP) dissolved in an inert organic solvent such as diethylbenzene (DEB). The specific problem with which this invention is concerned deals with a method for selectively and quantitatively stripping the plutonium from an organic extract containing not only plutonium but a mixture of plutonium with rare earths and lanthanide elements as well as other metal contaminants such as hydrochloric or nitric acid.

The present invention is based on the discovery that dialkyl substituted hydroquinones, exemplified by 2,5 di-tertiarybutyl hydroquinone (DBHQ) dissolved in a solvent mutually compatible with HDEHP has the capacity, at a kinetically rapid rate, to reduce the plutonium to a +3 oxidation state, thus enabling a selective and quantitative stripping of plutonium from the organic extract.

A succinct summary of an exemplary embodiment of the invention is provided in the accompanying figure which shows a flow sheet of a typical solvent extraction process conducted at room temperature in ambient air atmosphere in which the selected hydroquinone reducing agent is applied with advantage.

Because of the extremely high radioactivity associated with the feed and the product solution all operations are conducted under appropriate shielding employing remote handling devices. As shown, a feed solution 6 normal in hydrochloric acid containing a mixture of plutonium, transplutonium elements and zirconium is fed into the separating tank where it is mixed with an equal volume of 1 molar HDEHP dissolved in diethylbenzene. The feed solution contains a relatively large amount of zirconium which has dissolved from container materials used to conduct dissolution of plutonium-containing elements. The feed solution contains 0.05 normal nitric acid for the purpose of insuring that the plutonium is in the desirable +4 or +6 extractable oxidation states. While the feed solution is 6 normal in hydrochloric acid in the exemplary embodiment, it is within the scope of this invention to provide feed solutions having a range of 2–10 molar hydrochloric acid. The optimum HCl feed concentration will vary according to the metal constituents in the feed based on a comparison of the various separation factors for the major constituents. For most purposes, a HCl concentration in the range 6–8 molar will provide a maximum separation factor in favor of plutonium from other metals in the feed.

After a period of intimate mixing between the organic extractant and aqueous feed, and allowing a time for separation of phases and equilibrium to take place, an aqueous raffinate containing virtually all of the curium from the feed as well as small amounts of zirconium and plutonium are removed from the separating tank. After the aqueous raffinate has been removed, the organic extract is subjected to the usual scrubbing with dilute solutions of hydrochloric acid. The first three scrubbing solutions contain 0.02 normal nitric acid which is used as a holding oxidant for plutonium to insure that the plutonium remains in the organic phase in the +4 oxidation state. The first three scrub solutions are removed from the separating tank and drained into the aqueous raffinate to provide a combined raffinate solution which contains virtually all of the curium in the initial feed solution. Further processing of the aqueous raffinate by ion exchange methods allows separation of the curium from the trace amounts of plutonium and other contaminants. The organic extract in the separating tank is now mixed with a solution of DBHQ in 2-ethylhexanol to effect reduction of plutonium to the +3 oxidation state. Subsequent stripping of this mixture with a fourth scrub consisting of 3 volumes of 5 normal hydrochloric acid results in a stripped plutonium product containing about 99% of the accounted-for plutonium. The remaining organic solvent is removed as waste and discarded since it contains no detectable plutonium and too little curium to be economically recoverable.

The plutonium reducing agent DBHQ and other similar dialkyl substituted hydroquinones have an extremely limited solubility in the organic phase (HDEHP in DEB), but is soluble in organic alcohols having from 8 to about 13 carbon atoms so that a practical way for introducing the reducing reagent into the organic phase is to dissolve it in a suitable alcohol and then introduce the resultant solution into the organic phase. Aqueous stripping of the plutonium in the +3 oxidation state may be accomplished over a wide concentration range of hydrochloric acid. The optimum range in the system under discussion is 6–8 molar in hydrochloric acid since the plutonium extraction coefficient, that is the ratio of plutonium concentration in the organic phase to the plutonium concentration in the aqueous phase, is at a minimum in this range.

A summary of the stripping data obtained for Pu(IV) loaded into 1.0 molar HDEHP from 6 molar hydrochloric acid is shown in the table below. The HDEHP tenaciously hold Pu(IV) in the organic phase, and additions of reductants to hydrochloric acid strip solutions failed to quantitatively remove the plutonium. An organic-soluble reducing agent, 2,5 di-tert-butyl hydroquinone (DBHQ) was compared with the water-soluble reductants. The results showed this reagent was far superior, resulting in virtually complete stripping with the addition of 25 volume percent of the reductant solution. The inclusion of a reductant in the HCl solution did not improve the stripping process and therefore serves only as a holding reductant. The data in the table shows that plutonium stripping increases with increasing hydrochloric acid concentration.

TABLE

[Stripping of Pu(IV) from 1.0 M HDEHP in diethylbenzene loaded from 6 M HCl]

| Strip-solution (HCl) | Aqueous reductant | Organic reductant [1] | $S_o{}^2$ |
|---|---|---|---|
| 6 M | 0.1 M hydroquinone | | 0.16 |
| 6 M | 0.1 M ascorbic acid | | 0.16 |
| 6 M | 0.1 M hydroxylamine hydrochloride | | 0.0068 |
| 6 M | | | 0.0067 |
| 6 M | 0.1 M ascorbic acid | 25 vol. percent 0.2 M DBHQ [3] | 6.4 |
| 1 M | | do | 0.38 |
| 3 M | | do | 0.8 |
| 6 M | | do | 10.0 |
| 9 M | | do | 142 |

[1] The organic phase was modified by adding this amount of 0.2 M 2,5 di-tert-butyl hydroquinone (DBHQ) in 2-ethyl-1-hexanol.
[2] $S_o{}^a$ = concentration of Pu in aqueous phase / concentration of Pu in HDEHP
[3] Based on the volume of the extract.

While the use of DBHQ as an organic-soluble reductant for plutonium was successful when the plutonium is loaded from hydrochloric acid feed solutions, similar investigations with HDEHP loaded from nitric acid were initially unsuccessful. The presence of extracted nitrate in the organic phase and/or the use of nitric acid for stripping appeared to immediately oxidize the substituted hydroquinone to quinone, as evidenced by the production of intense yellow color in the organic phase. The process can be made successful for feed solutions of plutonium in nitric acid, however, if sufficient wash cycles are used to remove free nitrate previous to addition of the plutonium reducing agent DBHQ. Various solutions have been investigated: water, 0.5 M HCl, and 6 M HCl. With two 1-volume washes, the plutonium losses to these solutions were found to be 0.01%, 0.35%, and 0.65%, respectively. The addition of DBHQ to each of the wash organic extract solutions did not then produce the yellow color of quinone signifying the sufficient removal of free nitrate to avoid oxidation of the dialkyl substituted hydroquinone reducing agent. With this modification, aqueous nitric acid solutions can be used as the feed solution in the over-all solvent extraction scheme herein described.

In the preceding description, the invention has been described in terms of di(2-ethylhexyl) phosphoric acid as the organic extractant and 2,5 di-tert-butyl hydroquinone as the plutonium reducing agent. The invention may be practiced with other diesters of orthophosphoric acid such as di(1-methylheptyl) phosphoric acid, di(3-5,5-trimethylhexyl) phosphoric acid, and di(1-isobutyl-3-methylbutyl) phosphoric acid as well as other dialkyl substituted hydroquinones such as 2,5-di-sec-butylhydroquinone, 2,5-bis(2-methylpropyl)hydroquinone, 2,5-di-tert-pentylhydroquinone, 2,5 - di - neopentylhydroquinone, 2,5-bis(1-methylbutyl)hydroquinone, 2,5-bis(3-methylbutyl)hydroquinone, and 2,5-bis(1-ethylpropyl)hydroquinone.

What is claimed is:

1. In a liquid-liquid solvent extraction process in which plutonium in the +4 and +6 oxidation states as well as other metallic cations are extracted from an acidic aqueous feed solution into an organic extract consisting of a dialkyl substituted orthophosphoric acid dissolved in an inert organic solvent, the improvement which comprises mixing an organic solution of a dialkyl substituted hydroquinone to the plutonium-laden organic extract to selectively reduce the plutonium to the +3 oxidation state, contacting the resulting organic extract with a non-oxidizing strip solution and then disengaging the strip solution from the organic extract.

2. The process according to claim 1 in which the dialkyl substituted orthophosphoric acid is diethylhexyl phosphoric acid.

3. The process according to claim 1 in which the dialkyl substituted alkyl hydroquinone is 2,5-di-tertiarybutyl hydroquinone.

4. The process according to claim 1 in which the dialkyl substituted hydroquinone is dissolved in a liquid organic alcohol which is soluble in the organic extract.

5. The process according to claim 1 in which the stripping solution is hydrochloric acid.

References Cited

UNITED STATES PATENTS

| 2,918,349 | 12/1959 | Seaborg | 23—341 |
| 3,276,850 | 10/1966 | Rainey | 23—341 |
| 3,443,912 | 5/1969 | Silver | 23—345 |

FOREIGN PATENTS

| 1,000,798 | 8/1965 | Great Britain | 23—341 |

OTHER REFERENCES

Oak Ridge National Laboratory, document 4272, Chemical Technology Division Annual Progress Report for Period Ending May 31, 1968, pp. 95, 103–105.

CARL D. QUARFORTH, Primary Examiner

F. M. GITTES, Assistant Examiner

U.S. Cl. X.R.

23—339, 344; 252—301.1